(12) United States Patent
Shoji et al.

(10) Patent No.: US 12,102,104 B2
(45) Date of Patent: Oct. 1, 2024

(54) CARBONATION SENSATION ENHANCING AGENT FOR FOODS AND BEVERAGES HAVING CARBONATE STIMULATION

(71) Applicant: Ogawa & Co., Ltd., Tokyo (JP)

(72) Inventors: Yasutaka Shoji, Ibaraki (JP); Rie Nakasone, Ibaraki (JP); Toshio Miyazawa, Chiba (JP); Maiko Takahashi, Chiba (JP); Ryuichi Hirose, Chiba (JP)

(73) Assignee: OGAWA & CO., LTD., Tokyo (JP)

( * ) Notice: Subject to any disclaimer, the term of this patent is extended or adjusted under 35 U.S.C. 154(b) by 206 days.

(21) Appl. No.: 17/746,232

(22) Filed: May 17, 2022

(65) Prior Publication Data

US 2022/0273002 A1    Sep. 1, 2022

Related U.S. Application Data

(62) Division of application No. 17/261,391, filed as application No. PCT/JP2019/028231 on Jul. 18, 2019, now abandoned.

(30) Foreign Application Priority Data

Jul. 27, 2018  (JP) .................. 2018-141067

(51) Int. Cl.
*A23L 2/40*    (2006.01)
*A23L 2/54*    (2006.01)
(Continued)

(52) U.S. Cl.
CPC ............ *A23L 2/40* (2013.01); *A23L 2/54* (2013.01); *A23L 27/115* (2016.08); *A23L 29/035* (2016.08)

(58) Field of Classification Search
CPC ..... A23L 2/40; A23L 2/54; A23L 2/56; A23L 2/64; A23L 2/44
See application file for complete search history.

(56) References Cited

U.S. PATENT DOCUMENTS 5,523,105 A * 6/1996 Ishikawa ............... A23L 27/11
                                                426/660
5,948,460 A    9/1999 Kang et al.
(Continued)

FOREIGN PATENT DOCUMENTS

JP    7-145398      6/1995
JP    2005-13138    1/2005
(Continued)

OTHER PUBLICATIONS

International Search Report, issued Sep. 3, 2019 in corresponding International Patent Application No. PCT/JP2019/028231, with English language translation.
(Continued)

*Primary Examiner* — Changqing Li
(74) *Attorney, Agent, or Firm* — Wenderoth, Lind & Ponack, L.L.P.

(57) ABSTRACT

To provide an agent and a method for enhancing carbonation sensation whereby a natural carbonation sensation alone can be enhanced without imparting unnecessary smell or undesired tasted to foods and beverages having carbonate stimulation.

A carbonation sensation enhancing agent for foods and beverages having carbonate stimulation said carbonation sensation enhancing agent comprising polygodial as an active ingredient and being characterized by further comprising spilanthol in combination with polygodial.

3 Claims, 1 Drawing Sheet

(51) Int. Cl.
　　　*A23L 27/10*　　　(2016.01)
　　　*A23L 29/00*　　　(2016.01)

(56) References Cited

U.S. PATENT DOCUMENTS

| 2008/0050500 | A1 | 2/2008 | Muranishi et al. |
| 2012/0263658 | A1 | 10/2012 | Hofacker et al. |

FOREIGN PATENT DOCUMENTS

| JP | 2006-166870 | 6/2006 |
| JP | 2010-68749 | 4/2010 |
| JP | 2015-27309 | 2/2015 |
| JP | 2015-173631 | 10/2015 |
| JP | 2017043543 A * | 3/2017 |
| JP | 2017-104046 | 6/2017 |
| KR | 10-2016-0086796 | 7/2016 |
| WO | 2015/156244 | 10/2015 |
| WO | 2016/043021 | 3/2016 |
| WO | 2018/131575 | 7/2018 |
| WO | 2019/123701 | 6/2019 |

OTHER PUBLICATIONS

Prota, "Comparison of the chemical composition of three species of smartweed (genus *Persicaria*) with a focus on drimane sesquiterpenoids", Phytochemistry, 2014, 108, pp. 129-136 (Year: 2014).

Office Action issued Jun. 27, 2023 in corresponding Japanese Patent Application No. 2020-532336, with English language translation.

* cited by examiner

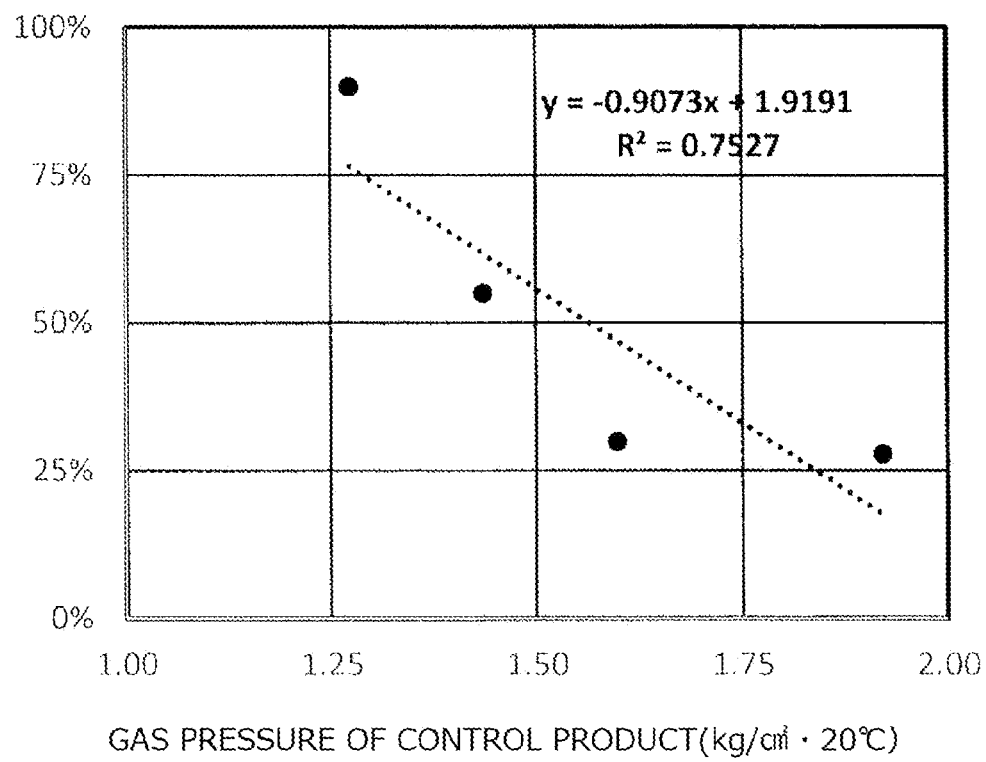

CARBONATION SENSATION ENHANCING AGENT FOR FOODS AND BEVERAGES HAVING CARBONATE STIMULATION

CROSS-REFERENCE TO RELATED APPLICATIONS

This application is a divisional application of U.S. application Ser. No. 17/261,391, filed Jan. 19, 2021, which was the national phase filing of International Patent Application No. PCT/JP2019/028231, filed Jul. 18, 2019, which claims the benefit of priority of Japanese Patent Application No. 2018-141067, filed on Jul. 27, 2018, the entire contents of which are incorporated herein by reference.

TECHNICAL FIELD

The present invention relates to a carbonation sensation enhancing agent for a food and a beverage having carbonate stimulation using polygodial as an active ingredient and a carbonation sensation enhancing method.

According to the present invention, an addition of polygodial to a food and a beverage having carbonate stimulation provides and enhances natural carbonation sensation without giving unnatural flavor or pungency.

TECHNICAL BACKGROUND

Carbonated beverages, typically including soda pop, cola, fruit-flavored carbonated beverages and carbonated water, from which we get pleasure in our daily lives, have long been a popular soft beverage both children and adults can drink.

Meanwhile, even in the field of solid foods, unique candies for enjoying carbonate stimulation, such as soda pop- or lemon soda-flavored tablets which contain baking soda and an acidulant and pop in the mouth, and candies with carbon dioxide gas embedded inside have appeared.

Carbonated beverages are quite different from other soft beverages such as fruit beverages in that they have a unique carbonation sensation. In other words, carbonated beverages are special in their refreshing, strong stimulation and feeling when going down produced by carbon dioxide gas when opened, and pleasant cooling sensation and fresh sensation created by the combination of carbon dioxide gas and flavor. The same applies to candies for enjoying carbonate stimulation.

In the present invention, the above carbonated beverages and solid foods including candies for enjoying carbonate stimulation are collectively referred to as foods and beverages having carbonate stimulation.

However, carbonated beverages go "flat" due to rapid degassing of carbon dioxide gas after opening, and the problem is that refreshing and strong stimulation of carbon dioxide gas, which is essential for carbonated beverages, is reduced, and carbonation sensation is reduced, and thus the beverages quickly become less palatable.

Furthermore, for products in a plastic (e.g., PET) container, which are widely spread nowadays, unlike those in a metal container or a glass container, the problem is that due to their incomplete gas barrier properties, carbon dioxide gas permeates the container and leaks to the outside overtime in the distribution process even when unopened, and a decrease in gas pressure causes a reduction of carbonate stimulation, decreasing the value of the product.

Assuming such leak of carbon dioxide gas in the distribution process, products are produced and shipped based on a design with high gas pressure.

However, for beverages with high fruit juice content or high solid content, since the beverages are more likely to overflow at the time of filling, problems with manufacture have been pointed out, such as difficulty in increasing gas pressure of carbon dioxide gas and having to reduce the rate of filling containers.

Furthermore, with recent consumers' preference for stronger stimulation, products at high gas pressure are in demand, and increasing gas pressure using conventional containers has the problem of safety, such as explosion or break of containers.

Likewise, consumers request stronger stimulation for solid foods such as candies having carbonate stimulation.

Then, in consideration of drop of gas pressure after opening, difficulty of increasing gas pressure due to product design, and consumers' preference for stronger stimulation, providing additives that enhance carbonation sensation even at the same gas pressure is expected.

For example, Patent Literature 1 proposes a carbonation sensation enhancing agent prepared by adding a pungent component contained in spices such as chili pepper and pepper in a small amount by which no pungency is felt, i.e., at a concentration lower than the threshold. However, the problem is that repeated intake causes pungency to be gradually felt.

Furthermore, Patent Literature 2 proposes a carbonation sensation enhancing method in which spilanthol or a plant extract or plant essential oil containing spilanthol is added to a carbonated beverage. However, when the amount of addition is increased to enhance stimulation, spilanthol itself leaves stimulation in the mouth and the taste is slightly unnatural.

Thus, with the growth of the market of foods and beverages having carbonate stimulation and the diversification of their types, there is a great demand for a carbonation sensation enhancing agent and a carbonation sensation enhancing method, which have an excellent effect of enhancing carbonation sensation and are capable of naturally enhancing only carbonation sensation without the flavor of the material itself being felt.

PRIOR ART DOCUMENT

Patent Document

Patent Literature 1: Japanese Patent Laid-Open No. 2010-68749
Patent Literature 2: Japanese Patent Laid-Open No. 2006-166870

SUMMARY OF THE INVENTION

Problems to be Solved by the Invention

The present invention aims at solving the problem of conventional carbonation sensation enhancing agents and carbonation sensation enhancing methods, and provides a carbonation sensation enhancing agent and a carbonation sensation enhancing method capable of enhancing only natural carbonation sensation without giving an unnecessary odor or an undesirable taste to a food and a beverage having carbonate stimulation.

Means for Solving Problems

The present inventors have conducted intensive studies to solve the above problem and as a result have found that polygodial, a terpene compound, solves the above problems and is an excellent active ingredient in a carbonation sensation enhancing agent capable of enhancing only carbonation sensation without giving unfavorable flavor, and have completed the present invention.

The present inventors have also found that polygodial has an immediate effect of enhancing carbonation sensation. Taking advantage of the above characteristics, polygodial and spilanthol are combined at a specific ratio to have an effect higher than that of only polygodial or only spilanthol, and as a result, a carbonation sensation enhancing agent and a carbonation sensation enhancing method capable of enhancing only natural carbonation sensation without giving unnatural sensation have been found.

Accordingly, the present invention is as follows.

[1] A carbonation sensation enhancing agent for a food and a beverage having carbonate stimulation, comprising polygodial as an active ingredient.

[2] The carbonation sensation enhancing agent according to [1], wherein polygodial is a chemically synthesized product or a natural product obtained from a plant body of *Persicaria hydropiper*, *Tasmannia lanceolata* or winterbark.

[3] The carbonation sensation enhancing agent according to [1] or [2], wherein spilanthol is used in combination.

[4] The carbonation sensation enhancing agent according to [3], wherein spilanthol is used in combination with polygodial at a ratio of 5 to 50 parts by mass per part by mass of polygodial.

[5] A method for enhancing carbonation sensation of a food and a beverage having carbonate stimulation, comprising using the carbonation sensation enhancing agent according to any one of the above [1] to [4], and adding polygodial to a food and a beverage having carbonate stimulation at 0.1 ppb to 400 ppb based on the food and beverage having carbonate stimulation.

[6] A food and a beverage having carbonate stimulation whose carbonation sensation is enhanced by the method according to the above [5].

[7] A method for producing a food and a beverage having carbonate stimulation having enhanced carbonation sensation, comprising adding an extract obtained by distilling an extract solution of *Persicaria hydropiper* with an organic solvent at a temperature of 150° C. or less to a food and a beverage having carbonate stimulation such that the concentration of polygodial is 0.1 ppb to 400 ppb.

[8] A method for producing a food and a beverage having carbonate stimulation having enhanced carbonation sensation, comprising the following Steps 1 and 2:

(step 1) distilling *Tasmannia lanceolata* oil at a temperature of 150° C. or less to remove a flavor component in the form of distillate to obtain distillation residue;

(step 2) adding the distillation residue obtained in Step 1 to a food and a beverage having carbonate stimulation as a purified product of *Tasmannia lanceolata* oil such that the concentration of polygodial is 0.1 ppb to 400 ppb.

Effect of the Invention

The carbonation sensation enhancing agent of the present invention comprising polygodial as an active ingredient enhances carbonation sensation or carbonate stimulation (a unique refreshing and stimulating sensation felt when eating or drinking a food or a beverage having carbonate stimulation) produced by carbon dioxide gas in the above carbonated beverage or carbon dioxide gas generated when a food having carbonate stimulation is put in the mouth, and thus can provide strong carbonate stimulation or recover the original carbonation sensation by compensating for the "flat" state caused by permeation of carbon dioxide gas through containers or degassing after opening.

Using polygodial and spilanthol in combination provides a carbonation sensation enhancing agent having excellent sustainability of the effect of enhancing carbonation sensation.

BRIEF DESCRIPTION OF THE DRAWING

FIG. 1 is a graph in which the concentration of carbon dioxide gas in a control product is plotted against selectivity of the carbonated water of Example 7 in Test Example 3.

MODE FOR CARRYING OUT THE INVENTION

The present invention will be described in detail below.

[1] Polygodial

Polygodial used in the present invention (IUPAC name (1R,4aS,8aS)-5,5,8a-trimethyl-1,4,4a,6,7,8-hexahydronaphthalene-1,2-dicarboxaldehyde) is diterpene aldehyde with the molecular formula $C_{15}H_{22}O_2$, a molecular weight of 234.33 and a melting point of 57° C., and has the following structure:

[Formula 1]

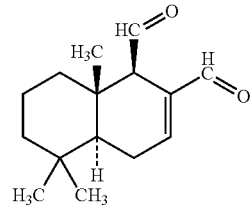

Polygodial is known as a stimulating component in plants, *Persicaria hydropiper*, *Tasmannia lanceolata* and winterbark.

Polygodial used in the present invention may be a synthetic product produced by a chemical method or those extracted from plants and animals. Polygodial prepared by any method may be used in the present invention. Polygodial may not be necessarily those of high concentration as long as the effect of the present invention is obtained.

Extract, essential oil and the like of a plant containing polygodial may be used without purification as long as the taste and odor of other components do not affect the flavor of the food and beverage having carbonate stimulation.

A commercially available product may be used as a synthetic product. Such products may be available from, for example, Wako Pure Chemicals Ltd.

Plants such as *Persicaria hydropiper*, also called water pepper, *Tasmannia Lanceolata*, winterbark, *Blechnum fluviatile* and *Thelypteris hispidula*, which are a pteridophyte, and *Porella vernicosa*, which is a bryophyte, are known to contain polygodial.

Furthermore, *Dendrodoris limbate* and *Doriopsilla pharpa*, which are sea slugs, are reported to be an animal containing polygodial.

It is preferable that in the case of use in a food and a beverage, extract or essential oil obtained from plants that have been eaten before is used from the viewpoint of safety. It is particularly preferable to use extract or essential oil obtained from *Persicaria hydropiper*, *Tasmannia lanceolata* and winterbark.

Examples of methods of collecting polygodial by extraction of *Persicaria hydropiper* include a method in which a solution prepared by extracting from leaves (including cotyledons), stems and seeds (which are collectively called a "plant body") of *Persicaria hydropiper* with an extraction solvent is distilled to give fraction containing polygodial.

As an extraction solvent for extraction of *Persicaria hydropiper*, water, alcohol (e.g., lower alcohols having 1 to 3 carbon atoms such as methanol, ethanol, propanol and isopropanol) acetone and ethyl acetate may be used singly, respectively, or in a mixture of any two or more of them.

It is preferable that of the extraction solvents, water, ethanol, acetone or ethyl acetate may be used singly or in a mixture of any two or more of them from the viewpoint of extraction rates, price and safety of operation. Ethyl acetate and ethanol are particularly preferred.

The amount of the extraction solvent is not particularly limited and may be adjusted depending on the purpose and may be 300 to 3,000 parts by mass, and more preferably 500 to 2,000 parts by mass per 100 parts by mass of *Persicaria hydropiper*.

The temperature of extraction is usually 0 to 100° C., preferably 20 to 50° C., and more preferably 30 to 40° C.

The time of extraction is usually 30 minutes to 5 hours, and preferably 1 to 2 hours, depending on the temperature of extraction.

The extract solution obtained is separated by solid liquid separation using filter paper and the like to give a crude extract solution containing polygodial.

Although the crude extract solution may be directly used in the step of distillation, it is preferable that the extraction solvent is distilled away to prepare a concentrated solution. Alternatively, before distilling away the extraction solvent, polygodial, which is the active ingredient, may be extracted from the crude extract solution into a low polar solvent, or highly polar impurities may be extracted into a highly polar solvent, by extraction by liquid-liquid distribution to remove the highly polar impurities.

When extracting by liquid-liquid distribution, 50 to 200 parts by mass of a solvent incompatible with the crude extract solution is added to 100 parts by mass of the crude extract solution. When the extraction solvent is, for example, ethyl acetate, water or a mixture of water and alcohol may be used. When the extraction solvent is water or a mixture of water and alcohol, ethyl acetate, hexane or heptane may be used.

The concentrate solution of *Persicaria hydropiper* is distilled to give a fraction containing polygodial.

Known distillation equipment may be used in the distillation step. Examples thereof include simple distillation, rectification, flash distillation and short path distillation.

It is necessary that distillation is performed at 150° C. or less, preferably 140° C. or less, more preferably 130° C. or less, and further preferably 120° C. or less because polygodial is decomposed at an evaporating temperature of more than 150° C. and the yield is significantly reduced. Thus, distillation needs to be performed under reduced pressure using a known vacuum pump such as oil rotary pump, a mechanical booster pump and a diffusion pump.

A large apparatus requires more heat for distillation and causes the problem of decomposition of active ingredients and reduction of energy efficiency, and thus short path distillation is most preferred, and an apparatus such as a centrifugal film apparatus and a falling film apparatus may be used.

While the degree of pressure reduction in distillation is not limited as long as polygodial is distilled at 150° C. or less, distillation at low pressure is desired, and the pressure is usually 300 Pa or less, preferably 200 Pa or less, more preferably 100 Pa or less, and particularly preferably 50 Pa or less.

The content of polygodial in the extract of *Persicaria hydropiper* is very small, and thus the recovery rate may be reduced when polygodial sticks to a cooling unit for condensing fraction, and the fraction sticking to the cooling unit may be collected by using a solvent as needed.

The solvent to be used is not limited, and may be selected based on the price, safety, handleability and use.

For example, water, ethanol, 1,3-butylene glycol, propylene glycol, dipropylene glycol, glycerol, diglycerol, 1,2-pentanediol, 1,3-propanediol, medium chain fatty acid ester, triacetin and triethyl citrate are preferred. When the extract of *Persicaria hydropiper* is in the form of an aqueous formulation, ethanol and a hydrated compound thereof are particularly preferred. When the extract is in the form of a lipophilic formulation, medium chain fatty acid ester (medium chain fatty acid triglyceride whose constituent fatty acid has 5 to 12 carbon atoms) is particularly preferred.

In some distillation apparatus used, the fraction sticking to the cooling unit may not be recovered with a solvent, or a complicated procedure is necessary and thus recovery may be difficult in some cases. Thus, it is preferable that in the step of distillation, an auxiliary solvent is previously added to the extract solution of *Persicaria hydropiper* before distillation.

Distillation of the extract solution of *Persicaria hydropiper* containing an auxiliary solvent increases the amount of fraction, enabling efficient recovery of fraction containing polygodial without performing the operation of recovery using a solvent.

The type and the amount of auxiliary solvent used may be selected based on the price, safety, handleability and use depending on the purpose. It is preferable that the auxiliary solvent has a boiling point almost the same as that of polygodial. The auxiliary solvent has a boiling point at atmospheric pressure (1 atm) of 180° C. or more, and more preferably 200° C. or more, and preferably 700° C. or less, and more preferably 600° C. or less.

An auxiliary solvent having a boiling point of 180° C. or less is not suitable because the efficiency of recovery of the auxiliary solvent in the cooling unit is low, and an auxiliary solvent having a boiling point of 700° C. or more is not suitable because little auxiliary solvent is distilled.

Preferred examples of auxiliary solvents include glycerol (boiling point at atmospheric pressure (1 atm) same below: 290° C.), propylene glycol (188° C.), dipropylene glycol (232° C.), medium chain fatty acid ester (medium chain fatty acid triglyceride whose constituent fatty acid has 5 to 12 carbon atoms)(370 to 670° C.), triacetin (260° C.) and triethyl citrate (294° C.)

When the extract of *Persicaria hydropiper* is in the form of an aqueous formulation, glycerol, propylene glycol, triethyl citrate and a mixture thereof are particularly preferred. When the extract is in the form of a lipophilic formulation, medium chain fatty acid ester (medium chain fatty acid triglyceride whose constituent fatty acid has 5 to 10 carbon atoms) is particularly preferred.

The auxiliary solvent may be added to the extract solution in any step as long as it is added thereto before distillation. However, it is desired that the auxiliary solvent be added before extraction or before distilling away the extraction solvent from the crude extract solution.

The amount of the auxiliary solvent is not particularly limited and may be adjusted depending on the purpose. 10 to 500 parts by mass, more preferably 50 to 200 parts by mass of the auxiliary solvent is used per 100 parts by mass of *Persicaria hydropiper* used as a raw material of extraction.

When the auxiliary solvent is added to the extract solution before extraction or before distilling away the extraction solvent from the crude extract solution, the extraction solvent is distilled away under conditions in which the auxiliary solvent is not distilled away.

Examples of methods of using polygodial derived from *Tasmannia lanceolata* include a method in which *Tasmannia lanceolata* oil extracted by, for example, a steam distillation method, a supercritical carbon dioxide extraction method, or a solvent extraction method, is directly used.

Alternatively, a purified product of *Tasmannia lanceolata* oil from which unnecessary flavor components have been removed by distilling *Tasmannia lanceolata* oil may be used.

"*Tasmannia Lanceolata* Extract" manufactured by ESSENTIAL OILS OF TASMANIA PTY LTD, "PEPPER OIL TASMANIAN" manufactured by BERJE and the like may be used as a commercially available *Tasmannia Lanceolata* oil.

When *Tasmannia lanceolata* oil is distilled and used as a purified product, known distillation equipment may be used in the distillation step. Examples thereof include simple distillation, rectification, flash distillation and short path distillation.

It is necessary that distillation is performed at 150° C. or less, preferably 100° C. or less, more preferably 70° C. or less, because polygodial is decomposed at an evaporating temperature of more than 150° C. and the yield is significantly reduced. Thus, distillation needs to be performed under reduced pressure using a known vacuum pump such as oil rotary pump, a mechanical booster pump and a diffusion pump.

When distilling *Tasmannia lanceolata* oil, distillation may be performed while adding an auxiliary solvent thereto. The type and the amount of auxiliary solvent may be selected based on the price, safety, handleability and use depending on the purpose. It is preferable that the auxiliary solvent has a boiling point almost the same as that of polygodial. The auxiliary solvent has a boiling point at atmospheric pressure (1 atm) of 180° C. or more, and more preferably 200° C. or more.

An auxiliary solvent having a boiling point of 180° C. or less is not suitable because thorough removal of unnecessary flavor components is impossible.

Preferred examples of auxiliary solvents include glycerol (boiling point at atmospheric pressure (1 atm), same below: 290° C.), propylene glycol (188° C.), dipropylene glycol (232° C.), medium chain fatty acid ester (medium chain fatty acid triglyceride whose constituent fatty acid has 5 to 12 carbon atoms)(370 to 670° C.), triacetin (260° C.) and triethyl citrate (294° C.)

When the purified product of *Tasmannia lanceolata* oil is in the form of an aqueous formulation, triacetin, triethyl citrate and a mixture thereof are particularly preferred. When the purified product is in the form of a lipophilic formulation, medium chain fatty acid ester (medium chain fatty acid triglyceride whose constituent fatty acid has 5 to 10 carbon atoms) is particularly preferred.

The amount of the auxiliary solvent added is not particularly limited and may be adjusted based on the purpose. 100 to 3,000 parts by mass, preferably 900 to 1,900 parts by mass of the auxiliary solvent is used per 100 parts by mass of *Tasmannia lanceolata* oil used as a raw material.

A large apparatus requires more heat for distillation and causes the problem of decomposition of active ingredients and reduction of energy efficiency, and thus short path distillation is most preferred, and apparatus such as a centrifugal film apparatus and a falling film apparatus may be used.

While the degree of pressure reduction in distillation is not limited as long as unnecessary flavor components are distilled at 150° C. or less and polygodial is not distilled, and the pressure is preferably 10 to 500 Pa, and more preferably 10 to 300 Pa.

A distillation residue from which unnecessary flavor components have been removed as a distillate under the above conditions may be used as a purified product of *Tasmannia lanceolata*.

[2] Spilanthol

Using spilanthol in combination with polygodial can provide a carbonation sensation enhancing agent and a carbonation sensation enhancing method having excellent sustainability, which can enhance only natural carbonation sensation for a long time without giving unnatural sensation.

The present inventors have also found that polygodial has an immediate effect of enhancing carbonation sensation. At the same time the present inventors have found that although spilanthol also has an effect of enhancing carbonation sensation, the effect is relatively delayed. Then combination of polygodial and spilanthol has made it possible to provide a carbonation sensation enhancing agent having excellent sustainability.

Spilanthol used in the present invention (IUPAC name (2E,6Z,8E)-N-Isobutyl-2,6,8-decatrienamide) is fatty acid amide with the molecular formula $C_{14}H_{23}NO$, a molecular weight of 221.34 and a melting point of 23° C., and has the following structure:

[Formula 2]

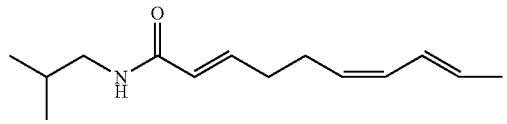

Spilanthol used in the present invention may be a synthetic product produced by a chemical method or those extracted from plants and animals.

Examples of methods of synthesis include the method disclosed in, for example, J. Am. Chem. Soc., 2461-2463, (1955), Naturally Occurring Insecticides, 149-156 (1971), Tetrahedron, 731-741 (1987).

In the present invention, spilanthol prepared by any method may be used and may not be necessarily those of high concentration as long as the effect of the present invention is obtained.

Extract, essential oil and the like of a plant containing spilanthol may be used without purification as long as the taste and odor of other components do not affect the flavor of the food and beverage having carbonate stimulation.

It is preferable that in the case of use in a food and a beverage, extract or essential oil obtained from plants that have been eaten before is used from the viewpoint of safety. It is particularly preferable to use extract or essential oil of *Spilanthes acmella* or *Spilanthes acmella* var. *oleracea* containing a large amount of spilanthol from a practical point of view of the supply and the price.

Examples of methods of collecting spilanthol by extraction include a method in which flower heads of *Spilanthes acmella* or *Spilanthes acmella* var. *oleracea* are dried and crushed, and then extracted with an organic solvent to give an extract solution containing spilanthol.

The organic solvent used for extraction is not particularly limited, and alcohols such as methanol, ethanol, propanol and propylene glycol, ketones such as acetone, esters such as ethyl acetate, ethers such as diethyl ether and hydrocarbons such as hexane and heptane may be used singly or in a mixture.

In particular, a polar organic solvent such as alcohol is preferred, and ethanol is particularly preferred from the viewpoint of safety. The solvent is distilled away from the resulting extract solution to give a spilanthol-containing extract.

(3) Additional Components

A flavor component, a colorant, an antioxidant, a preservative and the like usually used for a food and a beverage may be further added to the carbonation sensation enhancing agent of the present invention.

Natural flavors and synthetic flavors described in, for example, "Collection of Well-known Prior Arts (Flavors and Fragrances), Part II, Food Flavors," Japan Patent Office (published on Jan. 14, 2000) may be used as a flavor component without particular limitation within the range in which the effect of the present invention is not impaired.

The method of adding polygodial to a food and a beverage having carbonate stimulation is not particularly limited, and polygodial may be added thereto in any step in the manufacture of a food and a beverage having carbonate stimulation.

Although the amount of polygodial added is not particularly limited as long as the effect of the present invention is obtained, it is preferable that the carbonation sensation enhancing agent of the present invention is added to a food and a beverage having carbonate stimulation such that the concentration of polygodial in the food and beverage is 200 ppb or less, because the taste of polygodial itself or its stimulation is felt to affect the flavor of the food and beverage usually when the content of polygodial in the food and beverage is 400 ppb or more. The concentration is usually 0.1 ppb to 400 ppb, preferably 1 ppb to 200 ppb, and more preferably 10 ppb to 40 ppb.

Using polygodial and spilanthol in combination can enhance only natural carbonation sensation for a long time without giving unnatural sensation.

The ratio of spilanthol used in combination is 5 to 50 parts by mass, preferably 10 to 25 parts by mass per part by mass of polygodial.

When the ratio of spilanthol used in combination is less than 5 parts by mass, aftertaste and stimulating feeling when going down are weak, and when the ratio is more than 50 parts by mass, aftertaste and stimulating feeling when going down are too strong and the overall balance is lost.

(4) Food and Beverage Having Carbonate Stimulation

A food and a beverage having carbonate stimulation are not particularly limited as long as they have stimulation peculiar to carbonation. Examples thereof include carbonated beverages, carbonated alcoholic beverages, and frozen desserts, candies, jellies, gummies, tablet candies and chewing gum having carbonate stimulation.

Examples of forms of a non-beverage solid food include a food which contains both baking soda (sodium hydrogen carbonate) and an acidulant (e.g., citric acid) and generates carbon dioxide gas when dissolved in the mouth to create specific fizziness (soda pop- or lemon soda-flavored tablets), and candies with carbon dioxide gas embedded inside.

In "Quality Labeling Standards for Carbonated Beverages" (Notification No. 1682 of the Ministry of Agriculture, Forestry and Fisheries, Dec. 19, 2000), carbonated beverages refer to those prepared by pressing carbon dioxide in potable water and those to which a sweetener, an acidulant, a flavor and the like are further added. In the present invention, carbonated alcoholic beverages are also included in the carbonated beverages.

Specific examples include, but are not limited to, carbonated natural mineral water; carbonated water, carbonated beverages (e.g., soda pop and lemon soda) with a flavor of lemon, lemon and rhyme, rhyme, orange, grapefruit, grape berries, apple and the like, ginger ale, cola carbonated beverages, carbonated fruit juice beverages, lactic carbonated beverages; carbonated liqueurs such as canned fruit cocktail; sparkling wine; beer, low-malt beer and non-alcoholic beer-flavored beverages; and soft beverages with a flavor of canned fruit cocktail.

The carbonation sensation enhancing agent of the present invention enhances carbonation sensation produced by carbon dioxide gas in the above carbonated beverage, or carbonate stimulation caused by carbon dioxide gas generated when a food having carbonate stimulation is put in the mouth, and thus can provide strong carbonate stimulation or recover the original carbonation sensation by compensating for the "flat" state caused by permeation of carbon dioxide gas through containers or degassing after opening.

As used herein, carbonation sensation means a unique refreshing and stimulating sensation felt when drinking a carbonated beverage.

Carbon dioxide gas is dissolved in a carbonated beverage in a container under pressure, and when the container is opened and the pressure returns to normal, carbon dioxide gas which has been dissolved is generated, forming bubbles from the beverage.

One theory of carbonation sensation felt by humans is that the sense of pressure or the sense of pain in sensory cells of the tongue is stimulated when bubbles are generated to cause unique fizziness; and this sensation is also considered to affect the taste of beverages.

Another theory is that carbon dioxide dissolved stimulates the sense of taste and the somatic sensation, causing sensation that we recognize as carbonation sensation.

Accurate scientific grounds for carbonation sensation are not yet clear and primarily defining it is difficult, compared with those for sensations such as sweetness and bitterness for which sensory receptors and their mechanisms have been actively studied. Thus, the actual situation is that assessment of the effect of enhancing carbonation sensation must be relied on sensory evaluation of expert panelists.

EXAMPLES

Next the present invention will be described in more detail with reference to Examples, but Examples do not limit the present invention. All the gas pressures described below are values that are converted into those at a pressure of 20° C.

Preparation Example 1

Carbonated water for evaluation was prepared by diluting commercially available carbonated water (pressure of carbon dioxide gas before opening 3.0 kg/cm$^2$) with water such that the pressure of carbon dioxide gas was 1.3 kg/cm$^2$.

Examples 1 to 6, Comparative Examples 1 and 2

Polygodial (manufactured by Wako Pure Chemical Industries, Ltd.) was added to the carbonated water for evaluation of Preparation Example 1 such that the concentration was as shown in Table 1 described later and this was referred to as Comparative Examples 1 and 2, and Examples 1 to 6.

Production Example 1

1,000 g of ethyl acetate was added to 100 g of *Persicaria hydropiper* (JA Chikuzen Asakura, product name "Shikiko"), and after extracting for 1 hour at 40° C., solid-liquid separation was performed to give 900 g of a crude extract solution.

100 g of triethyl citrate was added to the resulting crude extract solution and ethyl acetate was removed under reduced pressure (100 mmHg, 40° C.). Then the mixture was distilled at 20 Pa at 120° C. using a falling film short path distillation apparatus to give 90 g of *Persicaria hydropiper* extract (content of polygodial 500 ppm).

Production Example 2

55 g of triacetin was added to 6 g of *Tasmannia lanceolata* oil (manufactured by ESSENTIAL OILS OF TASMANIA PTY LTD, polygodial content 19.4%) and impurities were filtered by filter paper. Then the mixture was distilled at 150 Pa at 70° C. using a falling film short path distillation apparatus to give 40 g of a purified product of *Tasmannia lanceolata* oil in the form of distillation residue (content of polygodial 2.5%).

Example 7

20 ppm of the *Persicaria hydropiper* extract of Production Example 1 was added to the carbonated water for evaluation of Preparation Example 1 and this was referred to as Example 7.

Example 8

0.05 ppm of *Tasmannia lanceolata* oil (manufactured by ESSENTIAL OILS OF TASMANIA PTY LTD, polygodial content 20%) was added to the carbonated water for evaluation of Preparation Example 1 and this was referred to as Example 8.

Example 9

0.4 ppm of the purified product of *Tasmannia lanceolata* oil of Production Example 2 was added to the carbonated water for evaluation of Preparation Example 1 and this was referred to as Example 9.

Test Example 1

Sensory evaluation was performed by 10 expert panelists based on the following Evaluation criteria using a product to which polygodial was not added as a control. For the strength of an offensive taste and odor, the average of the score of the 10 panelists was calculated and determined as the result of evaluation. The results are shown in Table 1.
Evaluation Criteria (Strength of Carbonate Stimulation)

+++: Highly effective (effect recognized by 8 or more panelists compared to a control)
++: Effective (effect recognized by 5 or more panelists compared to a control)
+: Slightly effective (effect recognized by 3 or more panelists compared to a control)
•: No effect/change (effect recognized by less than 3 panelists compared to a control)
Evaluation Criteria (Strength of Offensive Taste and Odor)

| Very strongly felt | 5 points |
| Strongly felt | 4 points |
| Felt | 3 points |
| Slightly felt | 2 points |
| Not felt | 1 point |

TABLE 1

| | Results of evaluation | | | |
|---|---|---|---|---|
| Subject of evaluation | Polygodial (ppb) | Strength of stimulation | Offensive taste and odor | Comment on offensive taste and odor |
| Comparative Example 1 | 0.01 | • | 1 | – |
| Example 1 | 0.1 | + | 1 | – |
| Example 2 | 1 | ++ | 1 | – |
| Example 3 | 10 | +++ | 1 | – |
| Example 4 | 20 | +++ | 1 | – |
| Example 5 | 40 | +++ | 1 | – |
| Example 6 | 200 | +++ | 1 | – |
| Comparative Example 2 | 400 | +++ | 3 | Pungency derived from polygodial |
| Example 7 (Persicaria hydropiper extract) | 10 | ++ | 1 | – |
| Example 8 (Tasmannia lanceolata oil) | 10 | ++ | 2 | Spicy and herbal flavor derived from Tasmannia lanceolata oil |
| Example 9 (Purified product of Tasmannia lanceolata oil) | 10 | ++ | 1 | – |

Table 1 shows that polygodial enhances only carbonation sensation at a concentration of 0.1 to 200 ppb in the carbonated beverage without giving an offensive taste or odor, or pungency.

By contrast, carbonation sensation was not enhanced at 0.01 ppb, and pungency appeared with enhanced carbonation sensation at 400 ppb.

Almost the same effect of enhancing carbonation sensation as that of a pure product of polygodial was found even when the *Persicaria hydropiper* extract or the *Tasmannia lanceolata* oil was used.

In particular, the purified product of *Tasmannia lanceolata* oil enhanced only carbonation sensation without giving an offensive taste or odor, or pungency.

Next, polygodial (Example 4) was compared with conventionally known carbonation sensation enhancing agents.

Comparative Example 3

Capsaicin (manufactured by Wako Pure Chemical Industries, Ltd.) was added to the carbonated water for evaluation of Preparation Example 1 such that the concentration was 60 ppb and this was referred to as Comparative Example 3.

Comparative Example 4

6-Gingerol (manufactured by Ogawa & Co., Ltd.) was added to the carbonated water for evaluation of Preparation Example 1 such that the concentration was 6 ppm and this was referred to as Comparative Example 4.

Comparative Example 5

Piperine (manufactured by Wako Pure Chemical Industries, Ltd.) was added to the carbonated water for evaluation of Preparation Example 1 such that the concentration was 8 ppm and this was referred to as Comparative Example 5.

Comparative Example 6

Allyl isothiocyanate (manufactured by Wako Pure Chemical Industries, Ltd.) was added to the carbonated water for evaluation of Preparation Example 1 such that the concentration was 2 ppm and this was referred to as Comparative Example 6.

Comparative Example 7

Cinnamaldehyde (manufactured by Wako Pure Chemical Industries, Ltd.) was added to the carbonated water for evaluation of Preparation Example 1 such that the concentration was 2 ppm and this was referred to as Comparative Example 7.

Comparative Example 8

Thymol (manufactured by Wako Pure Chemical Industries, Ltd.) was added to the carbonated water for evaluation of Preparation Example 1 such that the concentration was 2 ppm and this was referred to as Comparative Example 8.

Comparative Example 9

Carvacrol (manufactured by Wako Pure Chemical Industries, Ltd.) was added to the carbonated water for evaluation of Preparation Example 1 such that the concentration was 2 ppm and this was referred to as Comparative Example 9.

Comparative Example 10

2-Pentenal (manufactured by Wako Pure Chemical Industries, Ltd.) was added to the carbonated water for evaluation of Preparation Example 1 such that the concentration was 5 ppm and this was referred to as Comparative Example 10.

Comparative Example 11

Spilanthol (manufactured by Ogawa & Co., Ltd.) was added to the carbonated water of Preparation Example 1 such that the concentration was 1 ppm and this was referred to as Comparative Example 11.

Test Example 2

Sensory evaluation of the samples of Example 4 and Comparative Examples 3 to 11 was performed by 10 expert panelists based on the following Evaluation criteria 1 to 3 using the carbonated water for evaluation of Preparation Example 1 as a control.

The results are shown in Table 2.

[Evaluation Criteria 1] (Strength of Carbonate Stimulation)
- +++: Highly effective (effect recognized by 8 or more panelists compared to a control)
- ++: Effective (effect recognized by 5 or more panelists compared to a control)
- +: Slightly effective (effect recognized by 3 or more panelists compared to a control)
- •: No effect/change (effect recognized by less than 3 panelists compared to a control)

[Evaluation Criteria 2] (Mode of Generation of Carbonate Stimulation)

Mode of generation of carbonate stimulation was defined as follows and the timing when the highest effect was felt was selected. The timing that won a majority (6 panelists or more) was regarded as the mode of generation of carbonate stimulation of the substance. In the case of a tie (5 panelists for each), the result was referred to as middle.

Initial: stimulation felt immediately after the sample was put in one's mouth. The impact at the moment when one took the sample. Immediate effect.

Last: stimulation felt after swallowing the sample. Aftertaste and feeling when going down. Delayed effect.

[Evaluation Criteria 3] (Characteristics of Flavor)

Majority opinions were obtained from panelists' free descriptions of characteristics of flavor they felt.

TABLE 2

| | | | Results of evaluation | | |
|---|---|---|---|---|---|
| Subject of evaluation | Material | Concentration of component | Strength | Mode of generation of carbonate stimulation | Flavor |
| Example 4 | Polygodial | 20 ppb | +++ | Initial | No offensive taste or odor |
| Comparative Example 3 | Capsaicin | 60 ppb | +++ | Last | Feel pungency when taken several times |
| Comparative Example 4 | 6-Gingerol | 6 ppm | +++ | Last | Slight ginger-like flavor |
| Comparative Example 5 | Piperine | 8 ppm | ++ | Middle | Feel pungency when taken several times |

TABLE 2-continued

Results of evaluation

| Subject of evaluation | Material | Concentration of component | Strength | Mode of generation of carbonate stimulation | Flavor |
|---|---|---|---|---|---|
| Comparative Example 6 | Allyl isothiocyanate | 2 ppm | ++ | Initial | Japanese horseradish-like flavor |
| Comparative Example 7 | Cinnamaldehyde | 2 ppm | + | Initial | Cinnamon-like flavor |
| Comparative Example 8 | Thymol | 2 ppm | + | Initial | Thyme-like flavor |
| Comparative Example 9 | Carvacrol | 2 ppm | + | Initial | Thyme-like flavor |
| Comparative Example 10 | 2-Pentenal | 5 ppm | ++ | Initial | Green plant-like flavor |
| Comparative Example 11 | Spilanthol | 1 ppm | +++ | Last | No offensive taste or odor |

As is clear from Table 2, polygodial has an immediate effect of enhancing carbonation sensation (one feels stimulation immediately after putting it in his/her mouth with impact at the moment he/she drinks it). Only polygodial did not affect the flavor among materials which produced the same immediate carbonation sensation.

This shows that the carbonation sensation enhancing agent of the present invention can give natural carbonation sensation to carbonated beverages with a wide variety of flavors without giving unusual flavor or pungency to a food and a beverage having carbonate stimulation.

Next, equivalent concentration was determined to quantify the effect of enhancing carbonation sensation by the addition of polygodial.

Test Example 3

The strength of carbonate stimulation of the carbonated water of Example 7 prepared by adding the *Persicaria hydropiper* extract of Production Example 1 to the carbonated water for evaluation of Preparation Example 1 (1.3 kg/cm$^2$) and the strength of carbonate stimulation of the carbonated waters described in Table 3 (1.4 kg/cm$^2$, 1.6 kg/cm$^2$, 1.9 kg/cm$^2$) separately prepared as a control were compared by 18 to 20 expert panelists. The number of panelists who judged that the carbonated water of Example 7 had strong carbonation and the selectivity of the carbonated water of Example 7 are shown in Table 3.

Furthermore, the relation between the concentration of carbon dioxide gas in the control product and the selectivity of the carbonated water of Example 7 was plotted (see FIG. 1).

The concentration at the point where the selectivity was 50% was calculated from an approximate line and defined as the equivalent concentration, and as a result, the strength of stimulation of the carbonated water of Example 7 was found to correspond to 1.6 kg/cm$^2$ in terms of carbon dioxide gas. Thus, it is considered that addition of polygodial has the same effect as increasing the pressure of carbon dioxide gas by 0.3 kg/cm$^2$.

TABLE 3

Results of evaluation

| | Gas pressure (kg/cm$^2$) | Number of panelists (people) | Number of panelists selecting carbonated water of Example 7 (people) | Selectivity of carbonated water of Example 7 (%) |
|---|---|---|---|---|
| Test Section 1 | 1.3 | 20 | 18 | 90 |
| Test Section 2 | 1.4 | 20 | 11 | 55 |
| Test Section 3 | 1.6 | 20 | 6 | 30 |
| Test Section 4 | 1.9 | 18 | 5 | 28 |

Next, focusing on the difference in mode of generation of carbonate stimulation of carbonation sensation, the effect of combination use of polygodial and spilanthol, which is widely applicable and has the least offensive taste and odor out of the existing materials for enhancing carbonation sensation, was studied.

Test Example 4

Polygodial and spilanthol were added to the carbonated water for evaluation of Preparation Example 1 such that the concentration was as shown in Table 4 and these were referred to as Comparative Examples 12 and 13 and Examples 10 to 19.

For the samples of Examples 10 to 19 and Comparative Examples 12 and 13 to which the carbonation sensation enhancing agent had been added at the concentration shown in Table 4 described later, sensory evaluation was performed by 10 expert panelists for the overall strength of stimulation, the initial impact, and feeling when going down based on the Evaluation criteria 4 and 5 (multiple answers allowed), using the carbonated water for evaluation of Preparation Example 1 as a control.

The results are summarized by the method of Evaluation criteria 1.

When the results of evaluation of both the initial impact and the feeling when going down were "+" or more and the difference in the score of the initial impact and that of the feeling when going down was 1 or less, the sample was rated as having good balance.

The results are shown in Table 4.

[Evaluation Criteria 4] (Initial Impact)

Stimulation felt immediately after the sample was put in one's mouth. The impact at the moment when one took the sample.

[Evaluation Criteria 5] (Feeling when Going Down)

Stimulation felt after swallowing the sample.

TABLE 4

Results of evaluation

| Subject of evaluation | Polygodial (ppb) | Spilanthol (ppb) | Initial impact | Feeling when going down | Ratio ※ |
|---|---|---|---|---|---|
| Example 10 | 2 | 50 | + | + | 25 |
| Example 11 | 4 | 50 | ++ | + | 13 |
| Example 12 | 10 | 50 | + | ++ | 5 |
| Comparative Example 12 | 20 | 50 | +++ | + | 3 |
| Example 13 | 2 | 100 | ++ | ++ | 50 |
| Example 14 | 4 | 100 | +++ | +++ | 25 |
| Example 15 | 10 | 100 | +++ | +++ | 10 |
| Example 16 | 20 | 100 | +++ | +++ | 5 |
| Comparative Example 13 | 2 | 200 | • | +++ | 100 |
| Example 17 | 4 | 200 | ++ | +++ | 50 |
| Example 18 | 10 | 200 | ++ | +++ | 20 |
| Example 19 | 20 | 200 | +++ | +++ | 10 |

※ Spilanthol(ppb)/Polygodial(ppb)

Table 4 clearly shows that stimulation can be given without losing the balance of natural carbonation sensation by using 5 to 50 parts by mass of spilanthol in combination per part by mass of polygodial.

[Test Example 5] (Cola-Flavored Carbonated Beverage, Orange-Flavored Carbonated Beverage)

The carbonation sensation enhancing agent was added to a commercially available cola-flavored beverage (the pressure of carbon dioxide gas before opening 3.4 kg/cm$^2$) at the concentration of Comparative Example 14 and Examples 20, 21.

Furthermore, the carbonation sensation enhancing agent was added to a commercially available orange-flavored carbonated beverage (the pressure of carbon dioxide gas before opening 1.7 kg/cm$^2$) at the concentration of Comparative Example 15 and Examples 22, 23.

The strength of stimulation was evaluated by 10 expert panelists by the method of Evaluation criteria 1 using a base to which no carbonation sensation enhancing agent was added as a control. Majority opinions were obtained from panelists' free descriptions of characteristics of flavor they felt. The results are shown in Table 5.

TABLE 5

Results of evaluation

| Subject of evaluation | Base | Polygodial (ppb) | Spilanthol (ppb) | Strength of stimulation | Flavor |
|---|---|---|---|---|---|
| Comparative Example 14 | Commercially available cola-flavored carbonated drink | 0 | 300 | + | Stimulation delayed, effective for feeling when going down |
| Example 20 | | 5 | 0 | + | Sharp stimulation at early stage |
| Example 21 | | 4 | 100 | ++ | Stimulation stronger than that of only Polygodial or only Spilanthol; substantial stimulation as a whole and stimulation sustained |

TABLE 5-continued

| Subject of evaluation | Base | Polygodial (ppb) | Spilanthol (ppb) | Strength of stimulation | Flavor |
|---|---|---|---|---|---|
| Comparative Example 15 | Commercially available orange-flavored carbonated drink | 0 | 500 | ++ | Stimulation felt at later stage |
| Example 22 | | 8 | 0 | + | Stimulation felt at early stage; stimulation at the tip of the tongue, impact increasing when taken |
| Example 23 | | 5 | 100 | +++ | Stimulation stronger than that of only Polygodial or only Spilanthol; substantial and balanced stimulation as a whole |

Table 5 clearly shows that combination use of the two carbonation sensation enhancing agents increases the strength, and such use is efficient because the amount of use of both spilanthol and polygodial can be reduced.

Next, the effect of enhancing carbonation sensation was studied by changing the gas pressure of the base.

Test Example 6

Carbonated water for evaluation was prepared by diluting commercially available carbonated water (pressure of carbon dioxide gas before opening 3.0 kg/cm$^2$) with water such that the pressure of carbon dioxide gas was as shown in Table 6. Polygodial and spilanthol were added thereto such that the concentration was as shown in FIG. 6, and these were referred to as Examples 24 to 28.

The strength of stimulation was evaluated by 10 expert panelists by the method of Evaluation criteria 1 using carbonated water to which no carbonation sensation enhancing agent was added as a control. The results of evaluation are shown in Table 6.

TABLE 6

| | Gas pressure (kg/cm$^2$) | Polygodial (ppb) | Spilanthol (ppb) | Strength of stimulation |
|---|---|---|---|---|
| Example 24 | 1.9 | 20 | 0 | +++ |
| Example 25 | 1.3 | 20 | 0 | +++ |
| Example 26 | 1.3 | 2 | 50 | +++ |
| Example 27 | 1.9 | 10 | 100 | +++ |
| Example 28 | 3.0 | 10 | 200 | +++ |

Table 6 clearly shows that addition of the carbonation sensation enhancing agent of the present invention enhances carbonation sensation regardless of the gas pressure of the base.

Next, the effect of enhancing carbonation sensation in candies and gummies was verified.

[Test Example 7] (Candies Having Carbonate Stimulation)

180 g of "Palatinit (trade name)" manufactured by Mitsui Sugar Co., Ltd., 120 g of hydrogenated starch hydrolysate and 30 g of water were heated in a pod to 170° C., then cooled to 140° C. and 6 g of citric acid and 6 g of baking soda were added thereto.

After cooling to 130° C., 3 g of cola flavor (manufactured by Ogawa & Co., Ltd.), polygodial and spilanthol were added thereto at the concentration shown in Table 7. This was formed by stamping to give a candy having carbonate stimulation with enhanced carbonation sensation of the present invention (Examples 29, 30).

The strength of stimulation was evaluated by 10 expert panelists by the method of Evaluation criteria 1 using a candy having carbonate stimulation to which no carbonation sensation enhancing agent was added as a control. The results of evaluation are shown in Table 7.

TABLE 7

| | Polygodial (ppb) | Spilanthol (ppb) | Strength of stimulation | Comment |
|---|---|---|---|---|
| Example 29 | 20 | 0 | +++ | Sharp stimulation of carbonated feel at early stage |
| Example 30 | 10 | 100 | +++ | Sharp stimulation of carbonated feel at early stage, and stimulation sustained |

[Test Example 8] (Gummies Having Carbonate Stimulation)

25 g of granulated sugar, 40 g of starch syrup, 10 g of sorbitol and 10 g of water were weighed and heated to Bx80.

8 g of gelatin which had been dissolved in 12 g of water in a different container was added thereto.

Polygodial and spilanthol at the concentration shown in Table 8, 2 g of a 50% aqueous solution of citric acid and 1 g of a cola flavor (manufactured by Ogawa & Co., Ltd.) were quickly added thereto, and mixed until homogeneous, and then the resultant was poured into a starch mold and kept overnight to give gummies.

Sugared water adjusted to Brix 50 was sprayed thereto and powder separately prepared by mixing granulated sugar:citric acid:baking soda:vitamin C=85:8:5:2 was put thereon to give the gummies having carbonate stimulation with enhanced carbonation sensation of the present invention (Examples 31, 32).

The strength of stimulation was evaluated by 10 expert panelists by the method of Evaluation criteria 1 using gummies having carbonate stimulation to which no carbonation sensation enhancing agent was added as a control. The results of evaluation are shown in Table 8.

TABLE 8

Results of evaluation

| | Polygodial (ppb) | Spilanthol (ppb) | Strength of stimulation | Comment |
|---|---|---|---|---|
| Example 31 | 20 | 0 | +++ | Sharp stimulation of carbonated feel at early stage |
| Example 32 | 10 | 100 | +++ | Sharp stimulation of carbonated feel at early stage, and stimulation sustained |

Tables 7 and 8 clearly show that addition of the carbonation sensation enhancing agent of the present invention enhances carbonation sensation even in candies and gummies.

The invention claimed is:

1. A method for producing a food or beverage having enhanced carbonation sensation, comprising the following steps 1 to 3:
   (step 1) adding an auxiliary solvent having a boiling point of 180° C. or more to *Tasmannia lanceolata* oil to obtain a mixture;
   (step 2) distilling the mixture obtained in step 1 at a temperature of 150° C. or less to remove a flavor component in the form of distillate to obtain distillation residue;
   (step 3) adding the distillation residue obtained in step 2 to the food or beverage having carbonate stimulation such that the concentration of polygodial in the food or beverage is 0.1 ppb to 400 ppb.

2. A method for enhancing carbonation sensation of a food or a beverage having carbonate stimulation, comprising:
   adding polygodial as an active ingredient to the food or the beverage having carbonate stimulation, at 2 ppb to 40 ppb based on the food or the beverage having carbonate stimulation, and further adding spilanthol to the food or the beverage having carbonate stimulation, wherein a ratio of the spilanthol to the polygodial is 5 to 50 parts by mass of the spilanthol per one part by mass of the polygodial.

3. The method according to claim 2, wherein a ratio of the spilanthol to the polygodial is 10 to 25 parts by mass of the spilanthol per one part by mass of the polygodial.

* * * * *